(12) United States Patent
Kim

(10) Patent No.: US 10,685,629 B2
(45) Date of Patent: Jun. 16, 2020

(54) MODULE-TYPE MOBILE TERMINAL AND CONTROL METHOD THEREFOR

(71) Applicant: LG ELECTRONICS INC., Seoul (KR)

(72) Inventor: Jihwan Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 31 days.

(21) Appl. No.: 15/504,888

(22) PCT Filed: Sep. 3, 2014

(86) PCT No.: PCT/KR2014/008270
§ 371 (c)(1),
(2) Date: Feb. 17, 2017

(87) PCT Pub. No.: WO2016/035908
PCT Pub. Date: Mar. 10, 2016

(65) Prior Publication Data
US 2017/0270898 A1    Sep. 21, 2017

(51) Int. Cl.
*G09G 5/37* (2006.01)
*G06F 3/048* (2013.01)
*G06F 1/16* (2006.01)
*G09G 5/00* (2006.01)
*G09G 5/373* (2006.01)
*G06F 3/0481* (2013.01)

(52) U.S. Cl.
CPC ............ *G09G 5/37* (2013.01); *G06F 1/1632* (2013.01); *G06F 3/048* (2013.01); *G09G 5/006* (2013.01); *G09G 5/373* (2013.01); *G06F 3/04817* (2013.01)

(58) Field of Classification Search
CPC .......... G09G 5/37; G09G 5/373; G09G 5/006; G06F 1/1632; G06F 3/048
USPC ....................................................... 345/156
See application file for complete search history.

(56) References Cited

U.S. PATENT DOCUMENTS

| | | | |
|---|---|---|---|
| 8,704,944 B1 | 4/2014 | Wierzoch et al. | |
| 2007/0106950 A1* | 5/2007 | Hutchinson | G09B 5/067 715/761 |

(Continued)

FOREIGN PATENT DOCUMENTS

| | | |
|---|---|---|
| EP | 2261785 A1 | 12/2010 |
| EP | 2330802 A1 | 6/2011 |

(Continued)

*Primary Examiner* — Fred Tzeng
(74) *Attorney, Agent, or Firm* — Birch, Stewart, Kolasch & Birch, LLP

(57) ABSTRACT

The present invention relates to a detachable module-type mobile terminal and a control method therefor. The module-type mobile terminal, according to one embodiment of the present invention, comprises: a body; a display unit formed on the front side of the body, for outputting, by a first method, at least one icon related to an application; a sensor module detachable from the rear side of the body; a sensing unit for sensing whether the sensor module is provided at the rear side of the body; and a control unit for determining an application drivable by the provided sensor module and changing, by a second method different from the first method, a display method of an icon corresponding to the determined application among the at least one icon.

20 Claims, 14 Drawing Sheets

(56) References Cited

U.S. PATENT DOCUMENTS

| | | | |
|---|---|---|---|
| 2009/0280863 A1* | 11/2009 | Shin | G06F 1/1624 |
| | | | 455/557 |
| 2010/0058253 A1 | 3/2010 | Son | |
| 2010/0099456 A1 | 4/2010 | Kim | |
| 2010/0208434 A1 | 8/2010 | Kim et al. | |
| 2011/0057947 A1* | 3/2011 | Kobayashi | G09G 5/26 |
| | | | 345/592 |
| 2011/0134300 A1 | 6/2011 | Chung | |
| 2011/0230178 A1 | 9/2011 | Jones et al. | |
| 2012/0007833 A1 | 1/2012 | Liu et al. | |
| 2014/0152597 A1* | 6/2014 | Lee | G06F 3/0416 |
| | | | 345/173 |
| 2014/0160010 A1 | 6/2014 | Jung et al. | |
| 2017/0040002 A1* | 2/2017 | Basson | G09G 5/37 |
| 2017/0045979 A1* | 2/2017 | Li | G06F 3/044 |

FOREIGN PATENT DOCUMENTS

| | | |
|---|---|---|
| EP | 2683140 A2 | 1/2014 |
| KR | 10-2010-0043476 A | 4/2010 |
| KR | 10-2010-0094076 A | 8/2010 |
| KR | 10-2011-0063202 A | 6/2011 |

* cited by examiner (A)

(B)

(C)

(A)

(B)

(D)

(C)

(A)

(B)

(C)

(A)        (B)

(C)

(A)

(B)

(C)

(A)

(B)

(B)

MODULE-TYPE MOBILE TERMINAL AND CONTROL METHOD THEREFOR

CROSS REFERENCE TO RELATED APPLICATIONS

This application is the National Phase of PCT International Application No. PCT/KR2014/008270, filed on Sep. 3, 2014, which is hereby expressly incorporated by reference into the present application.

TECHNICAL FIELD

The present invention relates to a module-type mobile terminal which is detachable, and a method for controlling the same.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As the mobile terminal becomes multifunctional, it is implemented as a multimedia player having complicated functions such as capturing images or videos, playing music or videos, playing games, and receiving broadcastings.

Various attempts have been made to implement complicated functions in such a multimedia device by means of hardware or software.

Recently, a mobile terminal capable of performing blocking with respect to components related to its driving in unit of modules, and capable of detaching the modules (hereinafter, will be referred to as 'module-type mobile terminal'), is being developed. With such a development, various UX/UIs of the module-type mobile terminal are much required.

SUMMARY OF THE INVENTION

Therefore, an object of the present invention is to provide a GUI optimized to a module-type mobile terminal.

Another object of the present invention is to provide a method for changing screen information based on a mounted module.

To achieve these and other advantages and in accordance with the purpose of the present invention, as embodied and broadly described herein, there is provided a module-type mobile terminal, including: a body; a display unit formed on a front surface of the body, and configured to output one or more icons related to an application in a first manner; a sensor module detachably mounted to a rear surface of the body; a sensing unit configured to sense whether the sensor module has been mounted to the rear surface of the body or not; and a controller configured to determine an application which can be driven by the mounted sensor module, and to change a display manner of an icon corresponding to the determined application among the one or more icons, into a second manner different from the first manner.

In an embodiment, the controller may change the display manner of the icon corresponding to the determined application into the second manner different from the first manner, by applying a graphic effect to the icon.

In an embodiment, the graphic effect may be used to enlarge a size of the icon.

In an embodiment, the graphic effect may be used to vibrate the icon.

In an embodiment, the graphic effect may be used to change a color of at least one of the icon and a periphery of the icon.

In an embodiment, the controller may output an indicator indicating the icon corresponding to the determined application, to a periphery of the icon.

In an embodiment, if the mounted sensor module is detached, the controller may re-change the display manner of the icon from the second manner to the first manner.

In an embodiment, in an output state of a specific icon corresponding to an application which can be driven by at least two sensor modules, if a mounted state of one of the at least two sensor modules is sensed, the controller may change a display manner of the specific icon into a third manner different from the first manner.

In an embodiment, an indicator, indicating the mounted state of one of the at least two sensor modules, may be displayed on the icon displayed in the third manner.

In an embodiment, if one of the at least two sensor modules is mounted, the controller may output information about another sensor module rather than the mounted sensor module, among the at least two sensor modules.

In an embodiment, if all of the at least two sensor modules are mounted, the controller may display the icon displayed in the third manner, in the second manner.

In an embodiment, the icon displayed in the first manner may be deactivated so as not to be executable, and the icon displayed in the second manner may be activated so as to be executable.

According to another aspect of the present invention, there is provided a module-type mobile terminal, including: a body; a display unit formed on a front surface of the body, and configured to output one or more icons related to an application; a sensor module detachably mounted to a rear surface of the body; a sensing unit configured to sense whether the sensor module has been mounted to the rear surface of the body or not; and a controller configured to determine an application which can be driven by the mounted sensor module, and to change a display manner of an icon corresponding to the determined application among the one or more icons, wherein the controller locates the icon corresponding to the determined application, within a region corresponding to a mounting position of the sensor module, among an output region of the display unit.

In an embodiment, the controller may apply a graphic effect to a region corresponding to a mounting position of the sensor module, for recognition of the region.

In an embodiment, in an output state of a specific icon corresponding to an application which can be driven by at least two sensor modules, if the at least two sensor modules are mounted, the controller may locate the specific icon on a region corresponding to a mounting position of one of the at least two sensor modules, among regions corresponding to mounting positions of the at least two sensor modules.

In an embodiment, the region corresponding to a mounting position of one of the at least two sensor modules, may be a region corresponding to a position of a lastly-mounted sensor module among the at least two sensor modules.

In an embodiment, the controller may determine the region corresponding to a mounting position of one of the at least two sensor modules, based on a priority set to an application which can be driven by the at least two sensor modules.

In an embodiment, when a mounted state of the sensor module is sensed, the controller may generate a second page different from a first page where the one or more icons have been output, and may display the icon corresponding to the determined application on the second page.

In an embodiment, the icon displayed on the second page may be located within a region corresponding to a mounting position of the sensor module.

To achieve these and other advantages and in accordance with the purpose of the present invention, as embodied and broadly described herein, there is also provided a method for controlling a module-type mobile terminal, including: outputting one or more icons related to an application in a first manner; sensing whether a sensor module has been mounted or not; determining an application which can be driven by the mounted sensor module; and changing a display manner of an icon corresponding to the determined application among the one or more icons, into a second manner different from the first manner.

Advantageous Effects

In the present invention, a display manner of an icon corresponding to an application which can be driven by a mounted module, may be changed based on the mounted module. This may provide a user with an optimized GUI.

In the present invention, a display position of an icon corresponding to an application which can be driven by a mounted module, may be changed based on the mounted module. This may allow a user to more intuitively check an application which can be driven by the mounted module, and to more intuitively check a position of the mounted module.

DETAILED DESCRIPTION OF THE EMBODIMENTS

Figure 1:
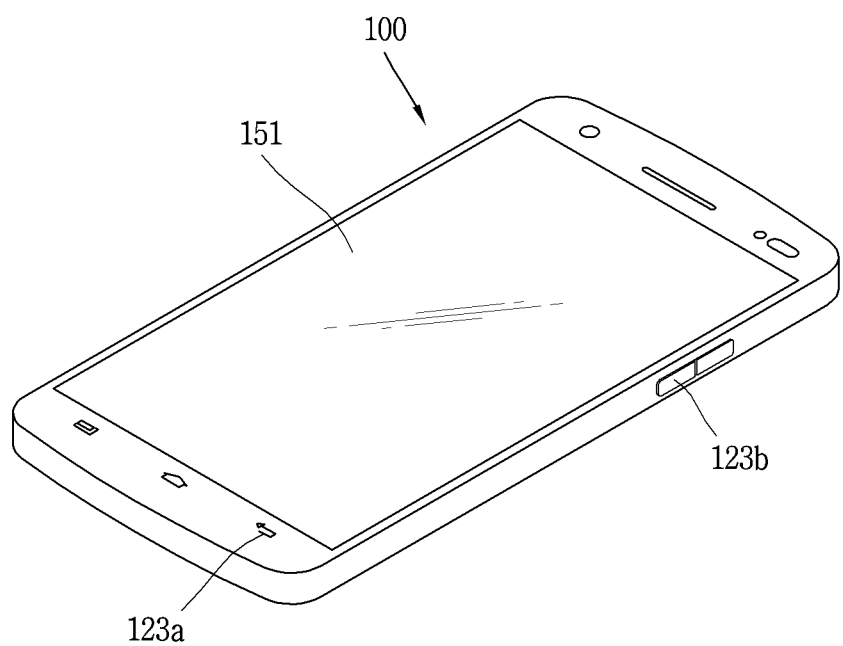
FIGS. 1 to 3 are conceptual views for explaining a module-type mobile terminal according to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and a digital signage.

Figure 2:
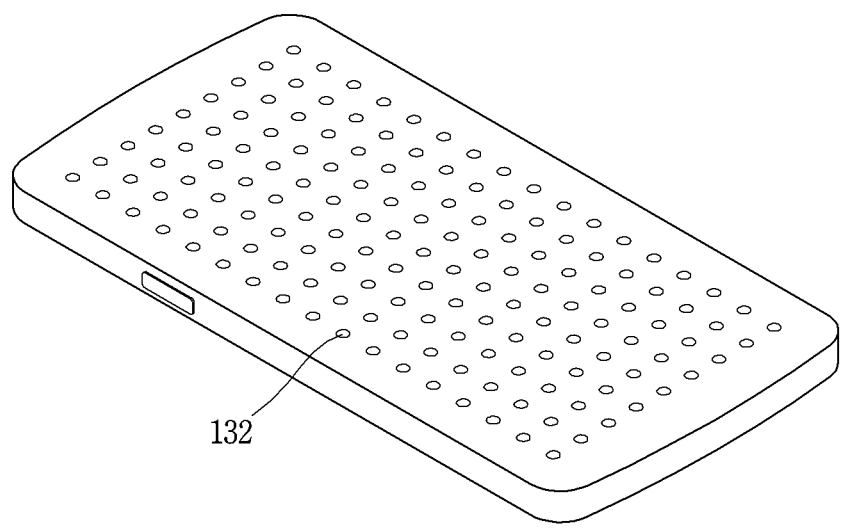
Figure 3:
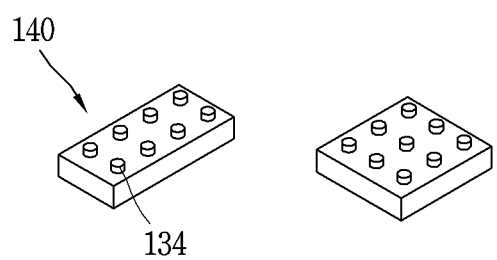

FIGS. 1, 2 and 3 are conceptual views for explaining a module-type mobile terminal according to the present invention.

A module-type mobile terminal 100 according to an embodiment of the present invention may be formed such that components thereof may be detachable. For instance, the detachable components of the module-type mobile terminal may be formed as blocks having different shapes. The components of the module-type mobile terminal, formed as blocks, may be detachably mounted to a body according to a user's selection.

However, the components of the module-type mobile terminal may be implemented in the form of not only blocks, but also any type by which the components are detachably mounted to the body, or by which the components are coupled to each other.

Hereinafter, a component of the module-type mobile terminal, which is formed to be detachable, is defined as a 'module' or a 'sensor module'. Hereinafter, the term of 'module' and 'sensor module' are together used, which should be understood as a detachable component of the module-type mobile terminal.

The module-type mobile terminal may include a body 100 formed such that a sensor module is detachably mounted thereto. The body 100 may be implemented in various forms to which a sensor module is detachably mounted. For instance, the body 100 may include at least one of a slide guide, a groove and a protrusion.

If the body 100 includes a slide guide, a sensor module may be mounted to or detached from the body in a sliding manner. In this case, the sensor module may be coupled to the body by using the slide guide formed at the body.

As shown in FIG. 2, if the body 100 includes a groove, a sensor module may include a protrusion formed to be coupled to the groove of the body as shown in FIG. 3. If the body 100 includes a protrusion, a sensor module may include a groove formed to be coupled to the protrusion of the body.

A detachably-mounted form of the aforementioned body and sensor module may be any form if different objects (e.g., the body and the sensor module) are formed to be detachably mounted. However, since a detachable structural characteristic of the body and the sensor module is out of the gist of the present invention, its detailed explanations will be omitted.

The body of the module-type mobile terminal according to the preset invention may include an input unit, an output unit, a sensing unit, a wireless communication unit, a memory, an interface unit, a controller, and a power supply unit, etc. For convenience, the components shown in FIG. 1 are provided at the body. More specifically, FIG. 1 illustrates that at least one of an input unit and an output unit is coupled to the body (is integrally formed with the body). However, as aforementioned, the input unit and the output unit may be formed to be detachably mounted to the body, and may be selectively detachably mounted to the body by a user.

The input unit may include a camera or an image input unit for inputting an image signal, a microphone or an audio input unit for inputting an audio signal, and a user input unit 123 (for example, a touch key, a push key (a mechanical key) and the like). Data (for example, audio or images) is obtained by the input unit 120 and may be analyzed and processed by a user's control command.

The output unit configured to output various types of information, such as audio, video and tactile output may include at least one of a display unit 151, an audio output module, a haptic module, and an optical output module. The display unit 151 may have an inter-layered structure or an integrated structure with a touch sensor in order to facilitate a touch screen. The touch screen may provide an output interface between the module-type mobile terminal 100 and a user, as well as function as the user input unit 123 which provides an input interface between the module-type mobile terminal 100 and the user.

The sensing unit may sense whether a sensor module corresponding to at least one of the components of the mobile terminal has been detachably mounted to the body or not. For instance, a reference electric signal may be flowing on the body. In this case, if the sensor module is mounted to or detached from the body, the electric signal flowing on the body may be changed due to the sensor module. The sensing unit may sense whether the sensor module has been mounted to or detached from the body based on the changed electric signal.

The sensing unit may sense whether the sensor module has been mounted to or detached from the body not based on the changed electric signal, but based on a sensed physical contact.

The wireless communication unit typically may include one or more modules which permit communications such as wireless communications between the module-type mobile terminal 100 and a wireless communication system, communications between the module-type mobile terminal 100 and another mobile terminal, communications between the module-type mobile terminal 100 and an external server, or communications between the body of the module-type mobile terminal 100 and a sensor module. Further, the wireless communication unit may typically include one or more modules which connect the module-type mobile terminal 100 to one or more networks.

The wireless communication unit may include one or more of a broadcast receiving module, a mobile communication module, a wireless Internet module, a short-range communication module, and a location information module.

In the present invention, the wireless communication unit including one or more modules may be formed to be detachably mounted to the module-type mobile terminal, or may be formed such that each module included in the wireless communication unit may be detachably mounted to the module-type mobile terminal.

The interface unit serves as an interface with various types of external devices that can be coupled to the module-type mobile terminal 100. The interface unit, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the module-type mobile terminal 100 may perform assorted control functions associated with a connected external device, in response to the external device being connected to the interface unit.

As aforementioned with reference to the wireless communication unit, in the present invention, the interface unit which includes one or more ports may be formed to be detachably mounted to the module-type mobile terminal, or may be formed such that each port included in the interface unit may be detachably mounted to the module-type mobile terminal.

The memory is typically implemented to store data to support various functions of the module-type mobile terminal 100. For instance, the memory may be configured to store application programs executed in the module-type mobile terminal 100, data or instructions for operations of the module-type mobile terminal 100, and the like. Some of these application programs may be downloaded from an external server via wireless communication. Other application programs may be installed within the module-type mobile terminal 100 at time of manufacturing or shipping, which is typically the case for basic functions of the module-type mobile terminal 100 (for example, receiving a call, placing a call, receiving a message, sending a message, and the like). It is common for application programs to be stored in the memory, installed in the module-type mobile terminal 100, and executed by the controller to perform an operation (or function) for the module-type mobile terminal 100.

The controller typically functions to control overall operation of the module-type mobile terminal 100, in addition to the operations associated with the application programs. The controller may provide or process information or functions appropriate for a user by processing signals, data, information and the like, which are input or output by the aforementioned various components, or activating application programs stored in the memory.

In order to activate the application programs stored in the memory, the controller may control at least part of the aforementioned components. Further, in order to activate the application programs, the controller may operate at least two of the components (sensor modules) included in the module-type mobile terminal 100, in a combined manner.

The power supply unit can be configured to receive external power or provide internal power in order to supply appropriate power required for operating the components (sensor modules) included in the module-type mobile terminal 100. The power supply unit may include a battery, and the battery may be configured to be embedded in the terminal body, or configured to be detachable from the terminal body.

At least some of the above components may operate in a cooperating manner, so as to implement an operation or a control method of a mobile terminal according to various embodiments to be explained later. The operation or the control method of the mobile terminal may be implemented on the mobile terminal by driving at least one application program stored in the memory.

Hereinafter, a module-type mobile terminal according to an embodiment of the present invention will be explained in more detail with reference to FIGS. 2 and 3.

At least one of the aforementioned components may be mounted to the body of the module-type mobile terminal 100 according to an embodiment of the present invention. For instance, as shown in FIG. 2, the body may include grooves 132, and a sensor module 140 of the module-type mobile terminal may include protrusions 134 coupled to the grooves 132.

As shown in FIG. 2, the at least one groove 132 included in the body may be formed with a predetermined interval therebetween. The sensor module 140 may include protrusions 134 formed to correspond to the grooves 132 having the predetermined interval.

As shown in FIG. 3, the sensor module 140 may be formed in various manners. More specifically, the sensor module 140 may include at least one protrusion 134 having the same interval as the grooves 132 included in the body. The sensor module 140 may be implemented in any manner, if it includes the protrusion 134 which may be coupled to the grooves 132 formed at the body.

The sensor module 140 of the present invention may include at least one of the aforementioned input unit, output unit, sensing unit, wireless communication unit, memory, interface unit, controller and power supply unit. Hereinafter, functions of the aforementioned components will be explained in more detail.

Firstly, regarding the wireless communication unit, a broadcast receiving module of the wireless communication unit is typically configured to receive a broadcast signal and/or broadcast associated information from an external broadcast managing entity via a broadcast channel. The broadcast channel may include a satellite channel, a terrestrial channel, or both. Two or more broadcast receiving modules may be utilized to facilitate simultaneously receiving of two or more broadcast channels, or to support switching among broadcast channels.

A mobile communication module can transmit and/or receive wireless signals to and from at least one network entity among a base station, an external mobile terminal and a server. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like.

The wireless signals may include audio call signals, video (telephony) call signals, or various formats of data to support communication of text and multimedia messages.

The wireless Internet module is configured to facilitate wireless Internet access. This module may be internally or externally coupled to the module-type mobile terminal 100. The wireless Internet module may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), Long Term Evolution (LTE), Long Term Evolution-Advanced (LTE-A), and the like. The wireless Internet module may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module performs such wireless Internet access. As such, the Internet module may cooperate with, or function as, the mobile communication module.

The short-range communication module is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module in general supports wireless communications between the module-type mobile terminal 100 and a wireless communication system, communications between the module-type mobile terminal 100 and another module-type mobile terminal 100, communications between the module-type mobile terminal and a network where another module-type mobile terminal 100 (or an external server) is located, via wireless area networks, or communications between the body of the module-type mobile terminal and the sensor module 140. One example of the wireless area networks is a wireless personal area networks.

In some embodiments, another module-type mobile terminal 100 may be a wearable device, for example, a smart watch, a smart glass or a head mounted display (HMD), which is able to exchange data with the module-type mobile terminal 100 (or otherwise cooperate with the module-type mobile terminal 100). The short-range communication module may sense or recognize the wearable device, and permit communication between the wearable device and the module-type mobile terminal 100. In addition, when the sensed wearable device is a device which is authenticated to communicate with the module-type mobile terminal 100, the controller, for example, may cause transmission of data processed in the module-type mobile terminal 100 to the wearable device via the short-range communication module. Hence, a user of the wearable device may use the data processed in the module-type mobile terminal 100 on the wearable device. For example, when a call is received in the module-type mobile terminal 100, the user may answer the call using the wearable device. Also, when a message is received in the module-type mobile terminal 100, the user can check the received message using the wearable device.

The sensor module 140 of the present invention may include the short-range communication module. If the sensor module 140 is positioned within a preset distance, it may perform wireless communication with the module-type mobile terminal, even if it does not directly contact the body of the module-type mobile terminal. The module-type mobile terminal may activate one or more applications by using the sensor module 140 which performs wireless communication. Further, the sensor module 140 may include a power supply unit in order to activate the short-range communication module.

The location information module is generally configured to detect a position of the mobile terminal. As an example, the location information module includes a Global Position System (GPS) module or a Wi-Fi module. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If necessary, the location information module may perform a function of another module of the wireless communication unit in a substitutional or additional manner, in order to obtain data on a position of the module-type mobile terminal. The location information module, configured to obtain a position (current position) of the module-type mobile terminal, is not limited to a module which directly calculates or obtains a position of the mobile terminal.

The input unit may be configured to permit various types of input to the module-type mobile terminal 100. Examples of such input include image, audio, data, and user input. Image input is often obtained using one or more cameras of the module-type mobile terminal 100. Such cameras may process image frames of still pictures or video obtained by image sensors in a video or image capture mode. The processed image frames can be displayed on the display unit 151 or stored in memory. In some cases, the cameras may be arranged in a matrix configuration to permit a plurality of images having various angles or focal points to be input to the module-type mobile terminal 100. As another example, the cameras may be located in a stereoscopic arrangement to acquire left and right images for implementing a stereoscopic image.

The microphone is generally implemented to process external audio input into electric voice data. The voice data can be processed in various manners according to a function being executed in the module-type mobile terminal 100. If desired, the microphone may include assorted noise removing algorithms to remove unwanted noise generated in the course of receiving the external audio.

The user input unit is a component that permits input by a user. Such user input may enable the controller to control operation of the module-type mobile terminal 100. The user input unit may include one or more of a mechanical input element (for example, a key, a button located on a front and/or rear surface or a side surface of the module-type mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit is generally configured to sense one or more of internal information of the mobile terminal, surrounding environment information of the mobile terminal, user information, or the like. The controller generally cooperates with the sending unit to control operation of the module-type mobile terminal 100 or execute data processing, a function or an operation associated with an application program installed in the mobile terminal based on the sensing provided by the sensing unit.

The sensing unit may be implemented using any of a variety of sensors, some of which will now be described in more detail.

A proximity sensor may include a sensor to sense presence or absence of an object approaching a surface, or an object located near a surface, by using an electromagnetic field, infrared rays, or the like without a mechanical contact. The proximity sensor may be arranged at an inner region of the mobile terminal covered by the touch screen, or near the touch screen.

The proximity sensor, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller processes data corresponding to proximity touches and proximity touch patterns sensed by the proximity sensor 141, and cause output of visual information on the touch screen. In addition, the controller can control the module-type mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the touch screen, or convert capacitance occurring at a specific part of the touch screen, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller. Accordingly, the controller may sense which region of the display unit 151 has been touched. Here, the touch controller may be a component separate from the controller, the controller, and combinations thereof.

In some embodiments, the controller may execute the same or different controls according to a type of touch object that touches the touch screen or a touch key provided in addition to the touch screen. Whether to execute the same or different control according to the object which provides a touch input may be decided based on a current operating state of the module-type mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera of the input unit typically includes at least one of a camera sensor (CCD, CMOS etc.), a photo sensor (or image sensors), and a laser sensor.

Implementing the camera with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The various sensors included in the sensing unit may be mounted in the body of the module-type mobile terminal. Each of the various sensors included in the sensing unit may be detachably mounted to the module-type mobile terminal. That is, the sensors may be selectively mounted to or detached from the module-type mobile terminal by a user.

The display unit 151 is generally configured to output information processed in the module-type mobile terminal 100. For example, the display unit 151 may display execution screen information of an application program executing at the module-type mobile terminal 100 or user interface (UI) and graphic user interface (GUI) information in response to the execution screen information.

In some embodiments, the display unit 151 may be implemented as a stereoscopic display unit for displaying stereoscopic images.

The typical stereoscopic display unit may employ a stereoscopic display scheme such as a stereoscopic scheme (a glass scheme), an auto-stereoscopic scheme (glassless scheme), a projection scheme (holographic scheme), or the like.

An audio output module is generally configured to output audio data. Such audio data may be obtained from any of a number of different sources, such that the audio data may be received from the wireless communication unit or may have been stored in the memory. The audio data may be output during modes such as a signal reception mode, a call mode, a record mode, a voice recognition mode, a broadcast reception mode, and the like. The audio output module can provide audible output related to a particular function (e.g., a call signal reception sound, a message reception sound, etc.) performed by the module-type mobile terminal 100. The audio output module 152 may also be implemented as a receiver, a speaker, a buzzer, or the like.

A haptic module can be configured to generate various tactile effects that a user feels, perceive, or otherwise experience. A typical example of a tactile effect generated by the haptic module is vibration. The strength, pattern and the like of the vibration generated by the haptic module can be controlled by user selection or setting by the controller. For example, the haptic module may output different vibrations in a combining manner or a sequential manner.

Besides vibration, the haptic module can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module can also be implemented to allow the user to feel a tactile effect through a muscle sensation such as the user's fingers or arm, as well as transferring the tactile effect through direct contact. Two or more haptic modules may be provided according to the particular configuration of the module-type mobile terminal 100.

An optical output module can output a signal for indicating an event generation using light of a light source. Examples of events generated in the module-type mobile terminal 100 may include message reception, call signal reception, a missed call, an alarm, a schedule notice, an email reception, information reception through an application, and the like.

A signal output by the optical output module may be implemented in such a manner that the mobile terminal emits monochromatic light or light with a plurality of colors. The signal output may be terminated as the mobile terminal senses that a user has checked the generated event, for example.

The interface unit serves as an interface for external devices to be connected with the module-type mobile terminal 100. For example, the interface unit 160 can receive data transmitted from an external device, receive power to transfer to elements and components within the module-type mobile terminal 100, or transmit internal data of the module-type mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The interface unit may be provided at the body of the module-type mobile terminal 100, and may be understood to serve as a passage between the body and the sensor module.

An identification module may be a chip that stores various information for authenticating authority of using the module-type mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the module-type mobile terminal 100 is connected with an external cradle, the interface unit 160 can serve as a passage to allow power from the cradle to be supplied to the module-type mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory can store programs to support operations of the controller and store input/output data (for example, phonebook, messages, still images, videos, etc.). The memory may store data related to various patterns of vibrations and audio which are output in response to touch inputs on the touch screen.

The memory may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The module-type mobile terminal 100 may also be operated in relation to a network storage device that performs the storage function of the memory over a network, such as the Internet.

The controller may typically control the general operations of the module-type mobile terminal 100. For example, the controller may set or release a lock state for restricting a user from inputting a control command with respect to applications when a status of the mobile terminal meets a preset condition.

The controller can also perform the controlling and processing associated with voice calls, data communications, video calls, and the like, or perform pattern recognition processing to recognize a handwriting input or a picture drawing input performed on the touch screen as characters or images, respectively. In addition, the controller can control one or a combination of those components in order to implement various exemplary embodiments disclosed herein.

The power supply unit receives external power or provides internal power and supply the appropriate power required for operating respective elements and components included in the module-type mobile terminal 100. The power supply unit may include a battery, which is typically rechargeable or be detachably coupled to the terminal body for charging.

The power supply unit may include a connection port. The connection port may be configured as one example of the interface unit 160 to which an external charger for supplying power to recharge the battery is electrically connected.

As another example, the power supply unit may be configured to recharge the battery in a wireless manner without use of the connection port. In this example, the power supply unit can receive power, transferred from an external wireless power transmitter, using at least one of an inductive coupling method which is based on magnetic induction or a magnetic resonance coupling method which is based on electromagnetic resonance.

The aforementioned components may be implemented in unit of blocks, and may be detachably mounted to the body of the module-type mobile terminal 100.

Various embodiments described herein may be implemented in a computer-readable medium, a machine-readable medium, or similar medium using, for example, software, hardware, or any combination thereof Hereinafter, embodiments related to a control method which can be implemented by the module-type mobile terminal will be explained. It is obvious to those skilled in the art that the present invention may be embodied in other form, within the spirit and scope of the invention.

Figure 4:
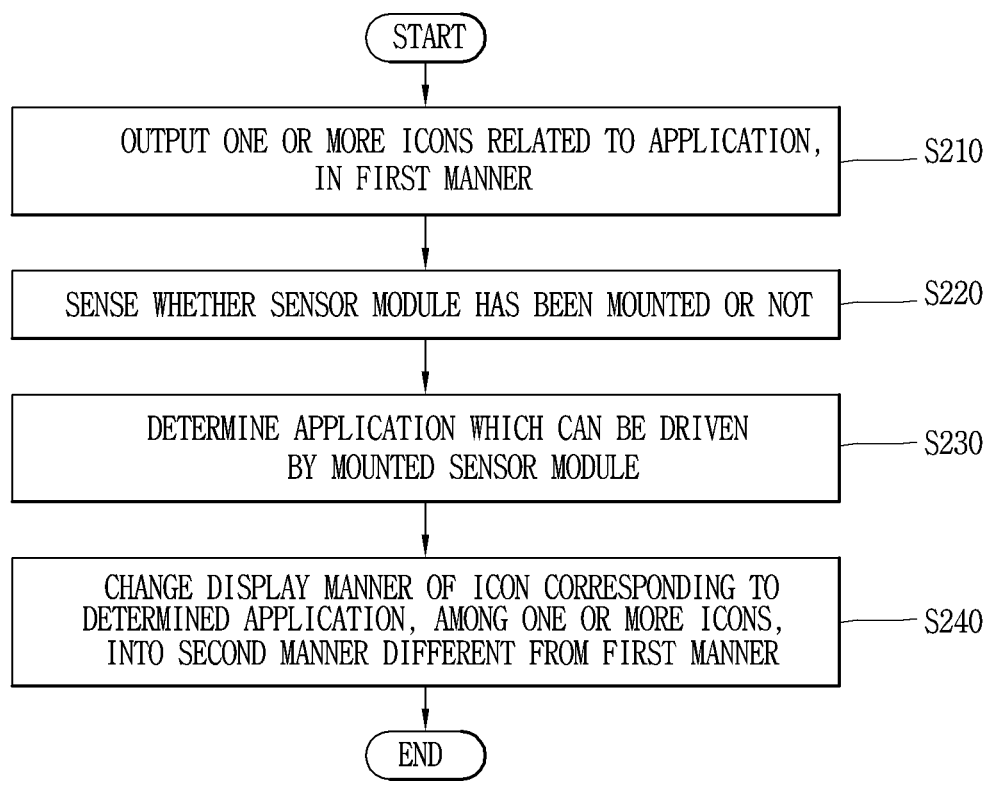
FIG. 4 is a flowchart for explaining a method for controlling a module-type mobile terminal according to an embodiment of the present invention.

FIG. 4 is a flowchart for explaining a method for controlling a module-type mobile terminal according to an embodiment of the present invention. And FIGS. 5A, 5B, 6, 7A, 7B and 8 are conceptual views for explaining that an icon display method is changed based on a mounted or detached state of a module.

As shown in FIG. 1, the display unit 151 may be provided on a front surface of the body. Further, the module-type mobile terminal according to the present invention may be provided with the sensing unit, the memory and the controller.

The memory may store therein one or more applications. At least part of the applications may be downloaded from an external server through wireless communication. Further, at least part of the applications may pre-exist at the module-type mobile terminal 100 when the module-type mobile terminal is presented to the market, for basic functions of the module-type mobile terminal 100 (e.g., call incoming function, call outgoing function, message receiving function, message sending function). The application may be stored in the memory, may be installed on the module-type mobile terminal 100, and may be operated to perform an operation (function) of the mobile terminal by the controller.

The application may be driven by at least one of the aforementioned components (sensor module). More specifically, the application may be driven by interworking with a component (sensor module) related to its function. For instance, a camera application which performs an image capturing function may be driven by interworking with the camera of the mobile terminal (or a camera sensor or a camera sensor module).

The display unit 151 may be provided on a front surface of the body of the module-type mobile terminal according to an embodiment of the present invention. At least one icon 300 related to an application may be output to the display unit 151. More specifically, the module-type mobile terminal according to an embodiment of the present invention may output at least one icon 300 related to an application in a first manner (S210).

The display unit 151 may be in an 'on' state for outputting at least one icon related to an application. The at least one icon 300 may be displayed on at least one of a home screen page and a menu.

The icon may include a widget provided from an application. The widget may be formed such that at least part of information or a function related to an application may be displayed on a home screen page or a menu. More specifically, the widget immediately provides at least one of information (content) and a function provided from an application, on the home screen page or the menu, without executing an additional application. That is, the widget may be a contracted execution screen of an application.

The controller may output at least one icon related to an application, to the display unit 151 in a first manner. Here, the first manner may include various manners, and may be an output manner from the conventional mobile terminal.

Figure 5A:
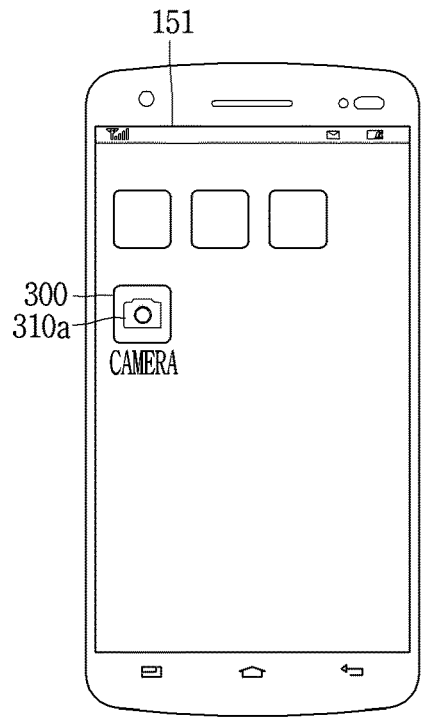
FIGS. 5A, 5B, 6, 7A, 7B and 8 are conceptual views for explaining that an icon display method is changed based on a mounted or detached state of a module.
Figure 5A:
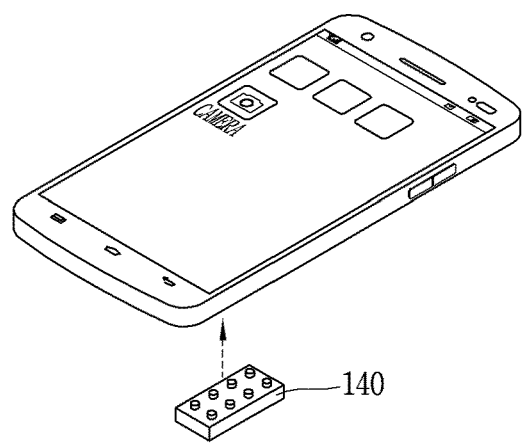
Figure 5A:
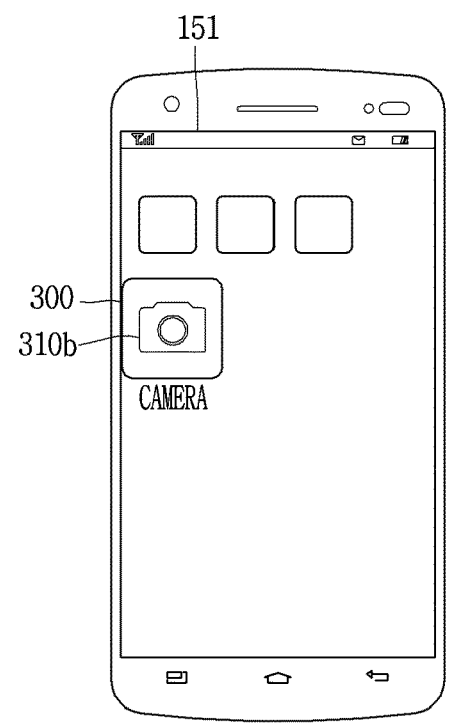

For instance, as shown in FIG. 5A(a), at least one icon related to an application, may be output to the display unit 151 in a first manner (310*a*). At least one 300 of the icons may be an icon related to an application which can be driven by a camera sensor module.

Then, it is sensed whether a sensor module has been mounted (S220). More specifically, the sensor module may be at least one of the aforementioned components of the mobile terminal. And the sensor module may be detachably mounted to at least one of a front surface and a rear surface of the body.

At least two same sensor modules, or at least two sensor modules which perform the same function, may be mounted to the module-type mobile terminal according to an embodiment of the present invention.

Figure 5B:
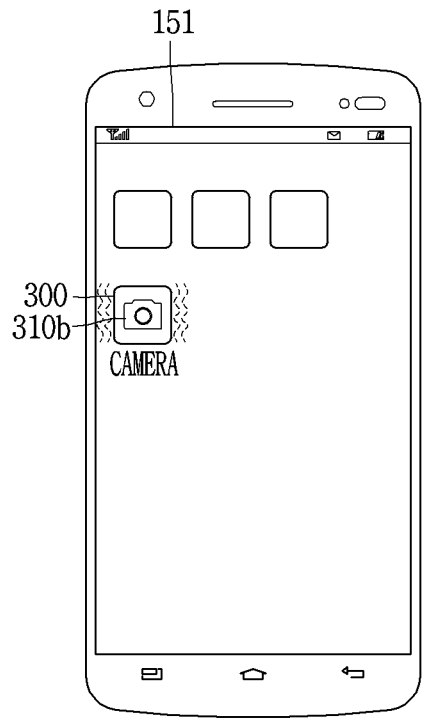
Figure 5B:
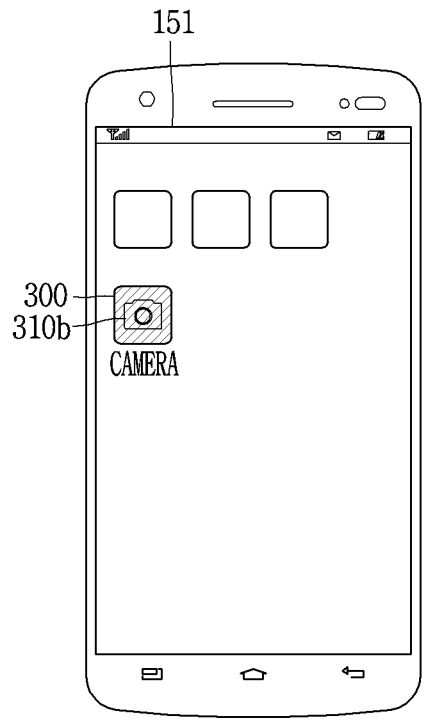
Figure 5B:
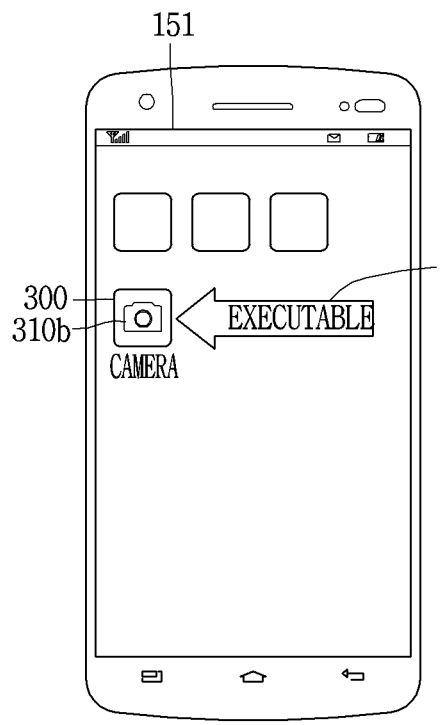
Figure 5B:
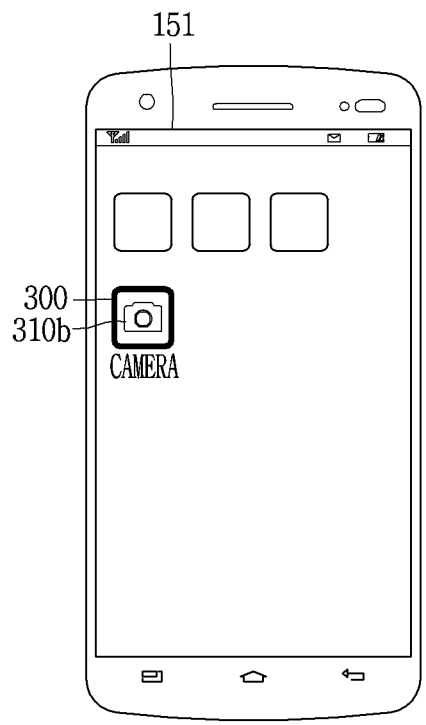

The sensing unit may sense whether the sensor module has been mounted to the rear surface of the body. For instance, as shown in FIG. 5B, the sensor module may be a camera sensor module 140.

The sensing unit may sense whether the sensor module has been mounted to the body in various manners. For instance, a reference electric signal may flow on the body. Here, if the sensor module is mounted to or detached from the body, the electric signal flowing on the body may be changed due to mounting of the sensor module. The sensing unit may sense a mounted or detached state of the sensor module, based on a change of the electric signal.

Alternatively, the sensing unit may sense a mounted or detached state of the sensor module, based on a physical contact, not a change of the electric signal.

Alternatively, while performing short-distance wireless communication with the sensor module, the sensing unit may sense a mounted state of the sensor module, if a communication method is converted into wired communication or contact communication by the interface unit rather than the short-distance wireless communication.

Alternatively, the sensing unit may determine a mounted state of the sensor module to the body, if it performs short-range wireless communication with the sensor module, by entering an effective range where it can perform short-range wireless communication with the sensor module.

Then, an application which can be driven by the mounted sensor module 140 is determined (S230). If a sensor module mounted to the rear surface of the body is the camera sensor module 140, the controller may determine an application which can be driven by the camera sensor module 140. An application related to the camera sensor module 140 may be a camera application including an image capturing function.

More specifically, the controller may determine a sensor module required to drive an application, based on detailed information (data) related to (included in) the application. Once the sensor module is mounted to the body, the controller may determine an application which can be driven by the mounted sensor module, based on detailed information related to the application.

The memory may pre-store therein data on various types of sensor modules and applications which can be driven by the sensor modules. The controller may determine an application which can be driven by a mounted sensor module, based on the pre-stored data.

Then, a display manner of an icon corresponding to the determined application, among at least one icon output to the display unit 151, is changed into a second manner 310*b* from a first manner 310*a* (S240).

For instance, as shown in FIG. 5A(b), in a state where an icon 300 corresponding to a camera application has been displayed on the display unit 151 in a first manner 310*a*, if the camera sensor module 140 is mounted to the rear surface of the body, the controller may determine a camera application which can be driven by the camera sensor module 140. Then, as shown in FIG. 5A(c), the controller may change a display manner of the icon 300 corresponding to the determined camera application into a second manner 310*b* different from the first manner 310*a*.

The second manner 310*b* may be implemented variously. More specifically, the controller may change a display manner of an icon corresponding to a determined application, into the second manner 310*b* different from the first manner 310*a*, by applying a graphic effect to the icon.

As the graphic effect for changing an icon display manner to the second manner 310*b* from the first manner 310*a*, may be used any effect which allows an icon displayed in a first manner to be displayed in a different manner from the first manner.

For instance, as shown in FIG. 5A(c), the graphic effect may be an effect to magnify a size of an icon. More specifically, the second manner 310*b* may be a method to output an icon in an enlarged manner.

As another example, as shown in FIG. 5B(a), the graphic effect may be an effect to vibrate an icon. Here, vibrating an icon may mean moving an output icon a predetermined number of times. That is, the controller may change a display manner of an icon corresponding to a determined application, such that the icon may vibrate.

As still another example, as shown in FIGS. 5B(a) and 5B(c), the graphic effect may be an effect to change a color of at least one of an icon and the periphery of the icon. More specifically, the controller may determine an application which can be driven by the mounted sensor module 140, and may change a color of the icon 300 corresponding to the determined application. And the controller may change a peripheral color of the icon 300 corresponding to the determined application. The controller may change the icon or the periphery of the icon in light and shade, chroma, brightness, etc., as well as color.

As shown in FIG. 5B(d), the controller may output an indicator 300 indicating an icon corresponding to a determined application which can be driven by a mounted sensor module, to the periphery of the icon. The indicator may be output in various manners. That is, the indicator may be output in an overlapped state with the icon, or may be output to a region of the display unit 151. The indicator may display information about a type of a mounted sensor module.

If the icon corresponding to a determined application has not been output to the display unit 151, the controller may output the icon corresponding to a determined application, to the display unit 151.

The sensing unit may sense a detached state of a mounted sensor module. Once the mounted sensor module is detached, the controller may restore a display manner of an icon from the second manner 310b, to the first manner 310a. More specifically, in a case where a display manner of an icon has been changed on the display unit 151 as a sensor module has been mounted, if the sensor module is detached, the controller may change the display manner of the icon into the original state before the change.

Figure 6:
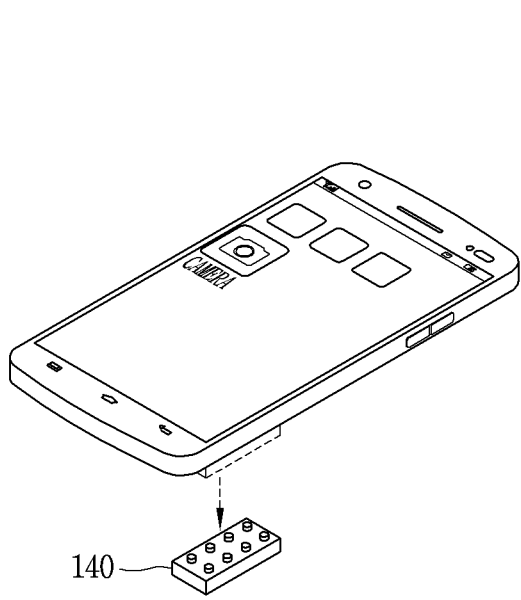
Figure 6:
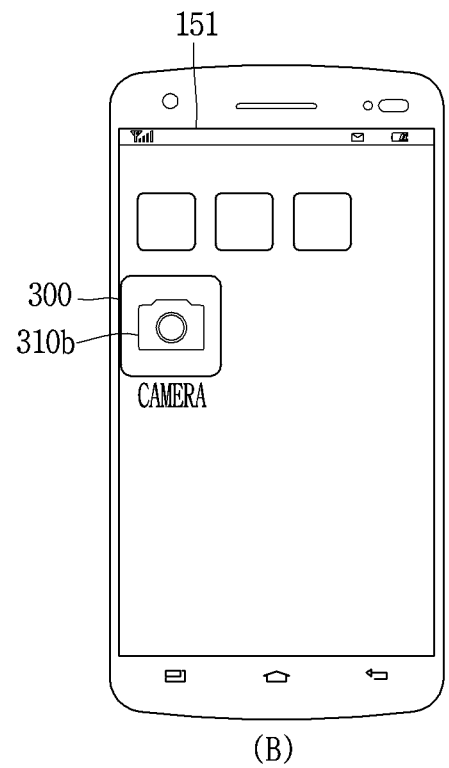
Figure 6:
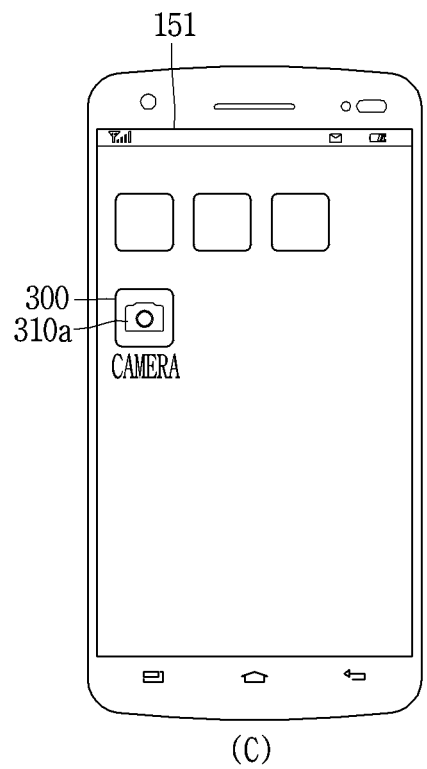

For instance, as shown in FIG. 6(*a*), the sensing unit may sense a detached state of a sensor module mounted to the rear surface of the body. As shown in FIG. 6(*b*), before the sensor module is detached, at least one icon may be output to the display unit 151 in a second manner 310b. Then, as shown in FIG. 6(*c*), if the mounted sensor module is detached, the controller may change the second manner 310b of the icon, into a first manner 310a.

At least part of applications stored in the memory may be driven by at least two sensor modules. In this specification, a map application will be explained as an example. It is assumed that a GPS module and a communication module are required to drive the map application. The GPS module and the communication module may be included in a sensor module which can be detachably mounted to the body of the module-type mobile terminal.

Figure 7A:
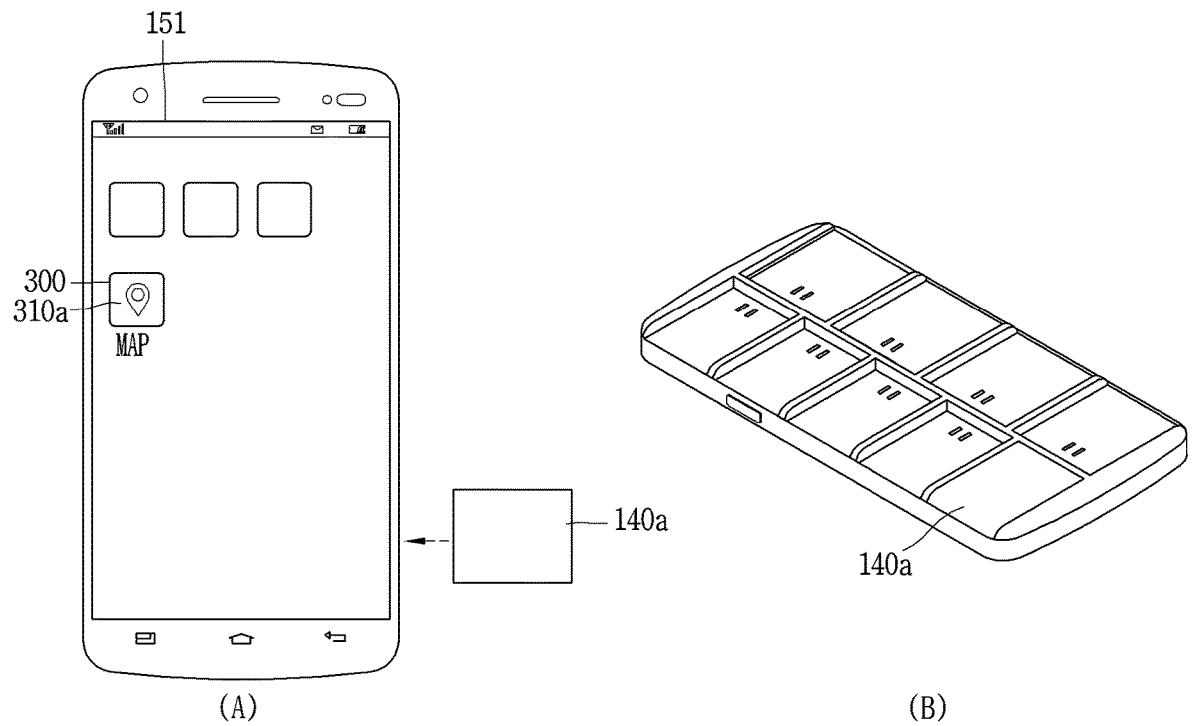
Figure 7A:
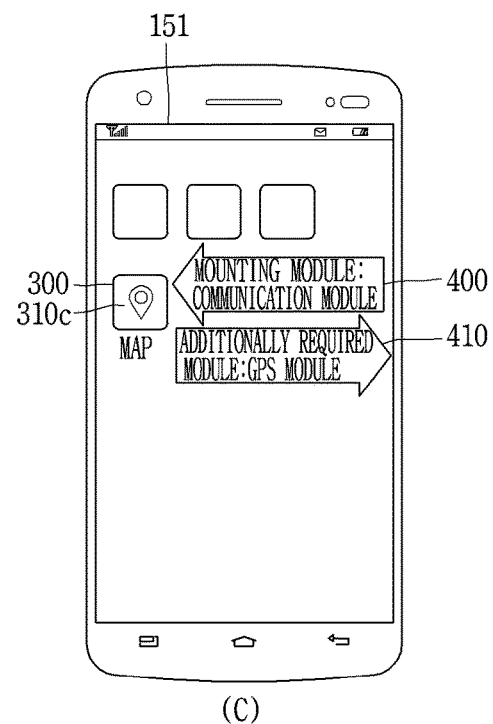

As shown in FIG. 7A(b), the body of the of the module-type mobile terminal according to an embodiment of the present invention includes a slide guide. The sensor module of the present invention may be detachably mounted to the body of the module-type mobile terminal, in a sliding manner.

A specific icon 300 corresponding to an application which can be driven by at least two sensor modules may be output to the display unit 151.

The specific icon 300 may be output in a first manner, before sensor modules are mounted.

In the output state of the specific icon 300 corresponding to an application which can be driven by at least two sensor modules, the sensing unit may sense a mounted state of one of the at least two sensor modules. In this case, the controller may change a display manner of the specific icon 300 into a third manner 310c different from the first manner 310a, based on a result of the sensing. The third manner 310c means a display manner different from the first and second manners.

For instance, as shown in FIG. 7A(a), the specific icon 300 corresponding to an application which can be driven by at least two sensor modules, may be displayed on the display unit 151.

Then, as shown in FIG. 7A(b), the sensing unit may sense a mounted state of one of the at least two sensor modules 140a (e.g., a communication module), to the rear surface of the body.

In this case, as shown in FIG. 7A(c), the controller may change a display manner of the specific icon 300, to a third manner 310c different from the first manner 310a.

The third manner 310c may be implemented to inform a mounted state of one of at least two sensor modules required to drive an application. The controller may change a display manner of the specific icon into the third manner 310c different from the first manner 310a, by applying a graphic effect to the specific icon. For instance, the graphic effect may be flickering or blinking of an icon. More specifically, the third manner 310c may be a method to flicker an icon.

An indicator 400 indicating a mounted state of one of the at least two sensor modules may be output to at least one of the icon 300 displayed in the third manner 310c and the periphery of the icon 300. Information about the mounted sensor module may be output to the indicator 400.

Once one of the at least two sensor modules is mounted, the controller may output information 410 about another sensor module rather than the mounted sensor module.

Said another sensor module rather than the mounted sensor module may mean a sensor module which has not been mounted yet among at least two sensor modules required to drive an application. For instance, it is assumed that one or more sensor modules required to drive a map application are a communication module 140a and a GPS module 140b.

If only the communication module 140a between the communication module 140a and the GPS module 140b is mounted, the icon 300 corresponding to a map application may be displayed on the display unit in the third manner 310c, as shown in FIG. 7A(c). Here, the indicator 400 indicating the mounted sensor module (the communication module 140a) may be output to the icon 300 displayed on the display unit 151 in the third manner, or may be output to the periphery of the icon. The controller may output information 410 related to a non-mounted sensor module (e.g., the GPS module 140b) among at least two sensor modules required to drive a map application.

Once all of the at least two sensor modules required to drive a map application are mounted, the controller may display the icon 300 displayed in the third manner 310c, in the second manner 310b. That is, the icon displayed in the second manner 310b may indicate that all of sensor modules required to drive an application corresponding to the icon have been mounted.

Figure 7B:
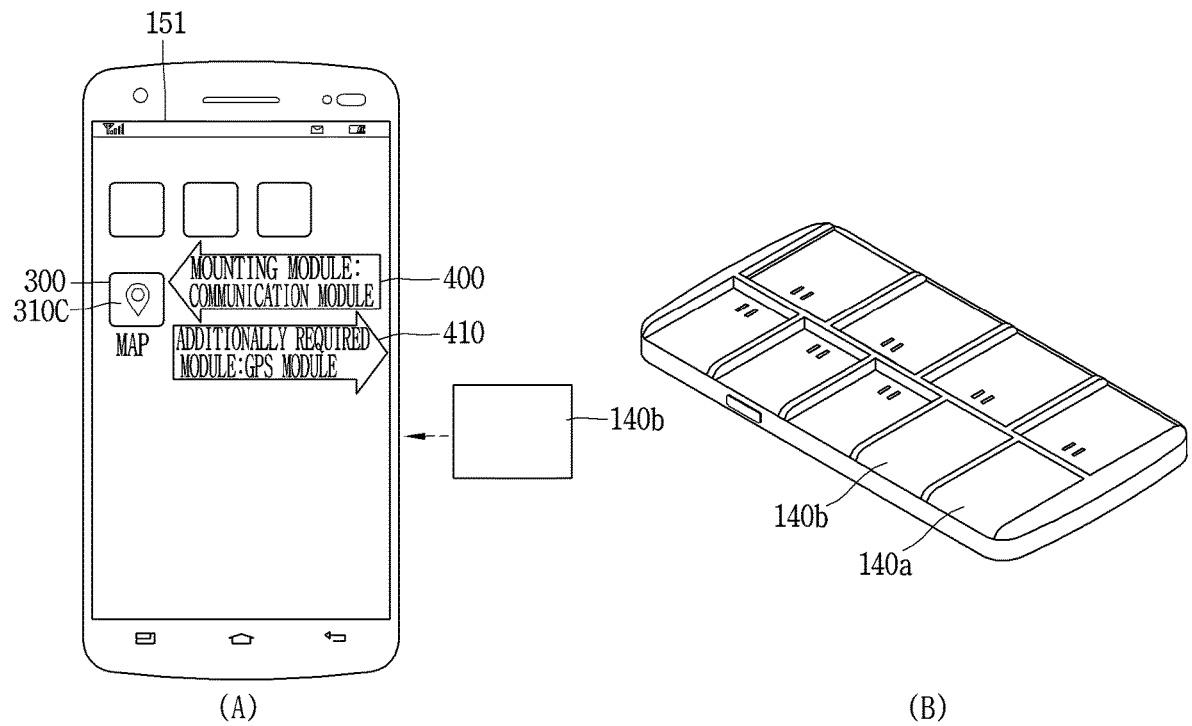
Figure 7B:
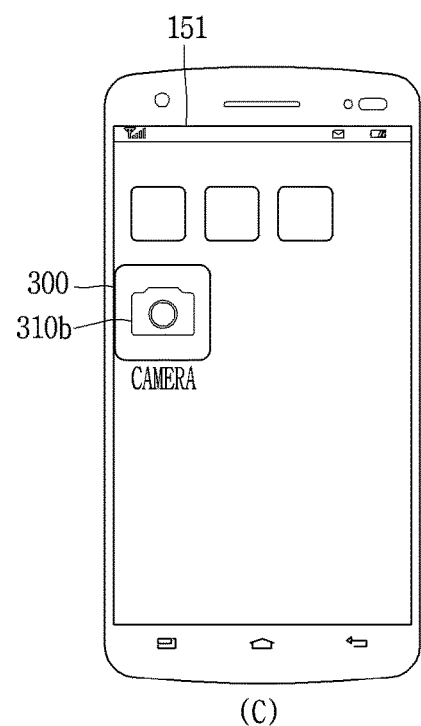

For instance, as shown in FIG. 7B(a), as only one of at least two sensor modules required to drive an application is mounted, the icon 300 corresponding to the application may be displayed on the display unit 151, in the third manner 310c different from the first manner 310a.

As shown in FIG. 7B(b), the sensing unit may sense that another sensor module (e.g., the GPS module 140b) rather than the mounted sensor module, among the at least two sensor modules required to drive an application, has been mounted to the body.

As all of the at least two sensor modules required to drive an application have been mounted, the controller may display the icon 300 displayed in the third manner 310c, in the second manner 310b.

Figure 8:
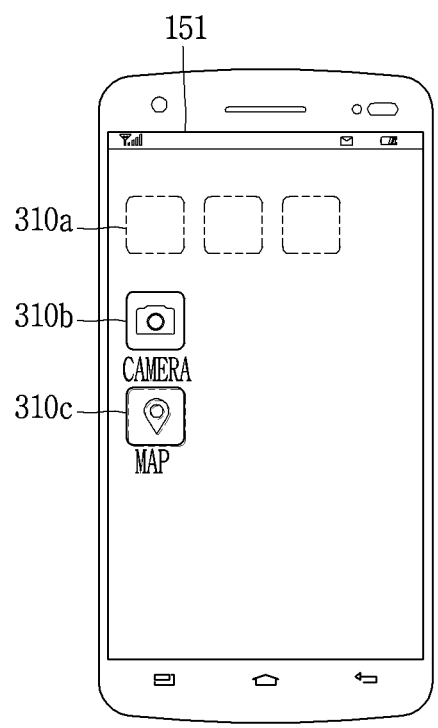

Hereinafter, another embodiment of the aforementioned first to third manners will be explained with reference to FIG. 8.

As aforementioned, displaying an icon in the first manner may mean displaying an icon so as to be selectable (executable) in the conventional mobile terminal. The term of 'selectable' may mean that an application corresponding to an icon is executable according to a user's selection (touch).

The controller may deactivate an icon displayed in the first manner 310a. That is, in the present invention, if a sensor module required to drive an application has not been mounted, the controller may deactivate an icon output to the display unit 151. That is, the icon displayed in the first manner 310a may be an icon deactivated so as not to be executable.

Once the icon displayed in the first manner 310a is selected, the controller may output information about a sensor module required to drive an application corresponding to the selected icon. The information about a sensor module may include a name, a type, an optimum position of the sensor module, etc.

An icon displayed in the second manner 310b may be activated so as to be executable. That is, once one or more sensor modules required to drive an applicant are mounted, the controller may activate an icon corresponding to the application so as to be executable. That is, the icon displayed in the second manner 310b may be an icon activated so as to be executable.

An icon displayed in the third manner 310c may be implemented to indicate that only one of at least two sensor modules required to drive an application has been mounted. For instance, as aforementioned, the third manner may be a graphic effect to flicker.

The icon displayed in the third manner 310c may be deactivated or activated under control of the controller or according to a user's selection. For instance, if at least part of functions of an application can be provided by one mounted sensor module among at least two sensor modules, the controller may activate the icon displayed in the third manner 310c so as to be selectable. On the other hand, if an application can not be driven even if one of at least two sensor modules has been mounted, the controller may deactivate the icon displayed in the third manner 310c so as not to be selectable.

The descriptions aforementioned with reference to FIGS. 5A to 8 may be equally or similarly applied to not only a case where the sensor module is directly mounted to the body, but also a case where the sensing unit can perform short-range wireless communication with the sensor module, by entering an effective range where the sensing unit can perform short-range wireless communication with the sensor module.

As aforementioned, in the present invention, a display method of an icon corresponding to an application which can be driven by a mounted sensor module may be changed. With such a configuration, a user may easily check an application which can be executed by a sensor module mounted by himself or herself. Further, in the present invention, as information about a non-mounted sensor module among at least two sensor modules required to drive an application is provided, user's convenience may be enhanced.

Hereinafter, a method of controlling a module-type mobile terminal according to another embodiment of the present invention will be explained with reference to the attached drawings.

Figure 9:
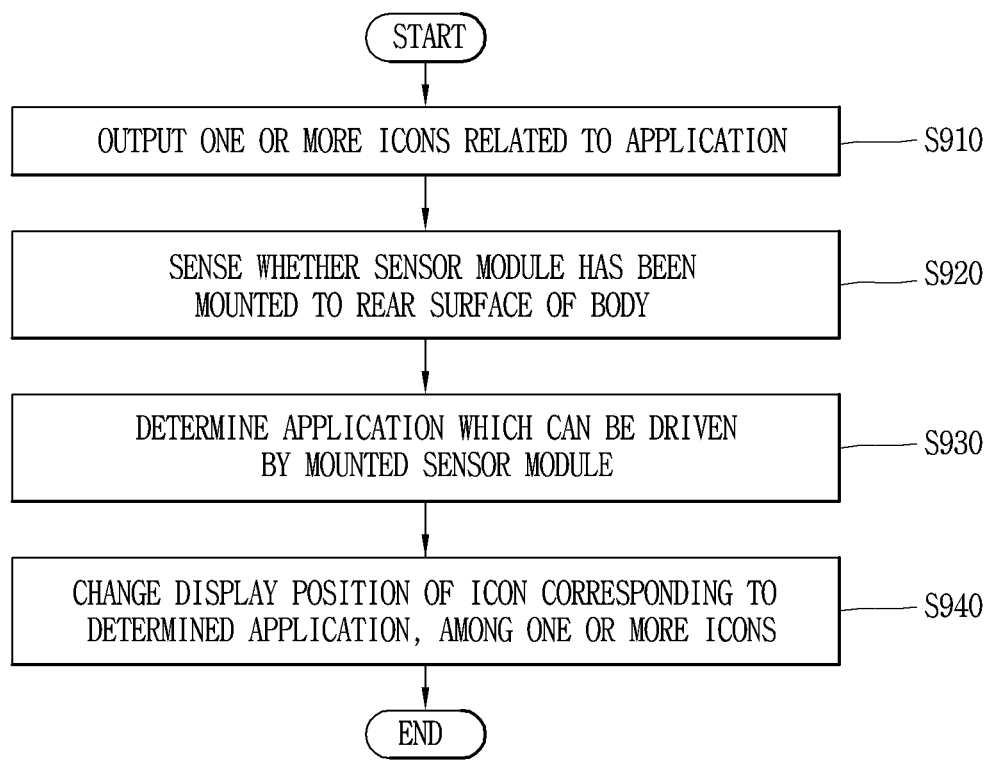
FIG. 9 is a flowchart for explaining a method for controlling a module-type mobile terminal according to another embodiment of the present invention.

FIG. 9 is a flowchart for explaining a method for controlling a module-type mobile terminal according to another embodiment of the present invention, and FIGS. 10, 11, 12A and 12B are conceptual views for explaining that an icon display position is changed when a module is mounted.

Firstly, one or more icons related to an application are output to the display unit 151 (S910).

Then, it is sensed by the sensing unit whether a sensor module has been mounted to the rear surface of the body or not (S920).

Then, an application which can be driven by the mounted sensor module is determined by the controller (S930).

The descriptions aforementioned with reference to S210-S230 of FIG. 4 may be equally or similarly applied to S910-S930.

Then, a display position of an icon corresponding to the determined application, among the one or more icons output to the display unit 151, is changed (S940). More specifically, as shown in FIGS. 4 to 8, the controller may change not only a display method of the icon 300 corresponding to the determined application, but also a display position thereof.

The controller may output the icon 300 corresponding to the determined application, within a region 500 corresponding to a mounting position of the sensor module, on the display unit 151.

Figure 10:
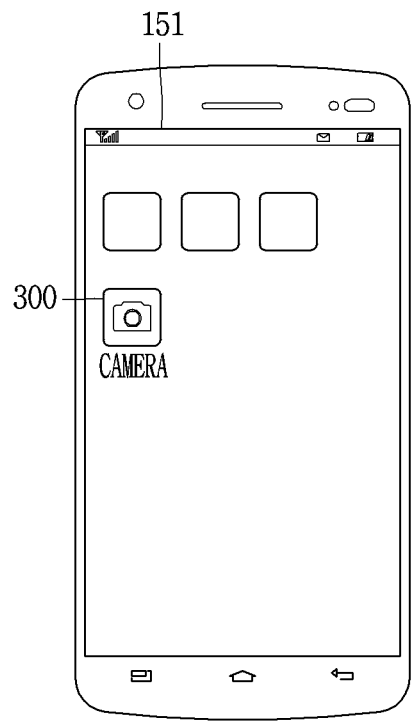
FIGS. 10, 11, 12A and 12B are conceptual views for explaining that an icon display position is changed when a module is mounted.
Figure 10:
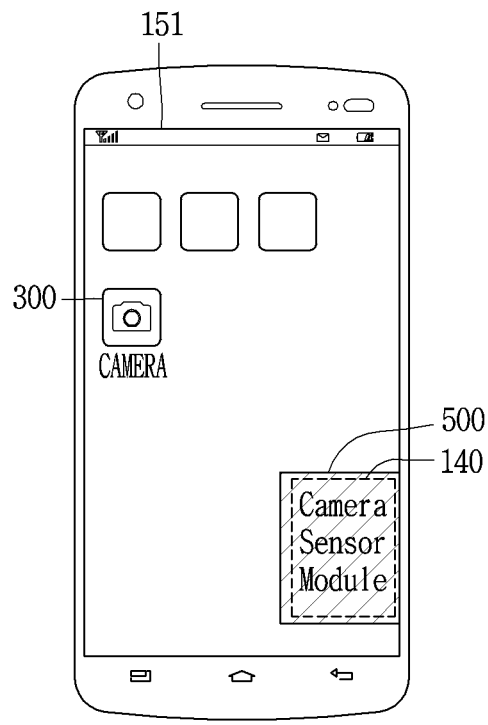
Figure 10:
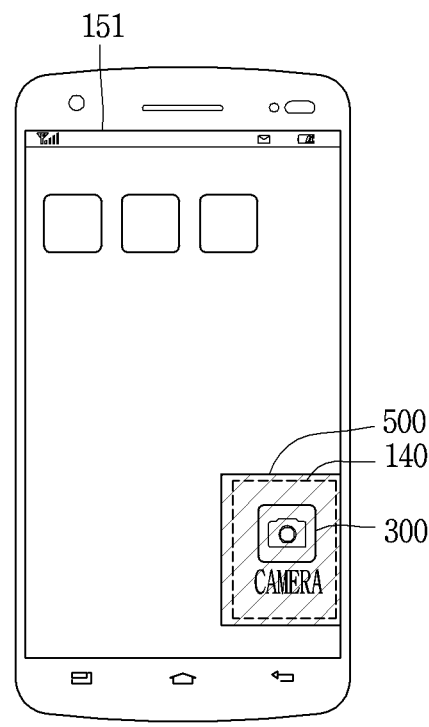

For instance, as shown in FIG. 10(*a*), one or more icons 300 related to an application may be output to the display unit 151. It is assumed that one of icons output to the display unit 151 corresponds to a camera application. Further, it is assumed that the camera application can be driven by the camera sensor module 140.

As shown in FIG. 10(*b*), the sensing unit may sense a mounted state of a sensor module (e.g., the camera sensor module) to the rear surface of the body.

In this case, the controller may determine an application which can be driven by the mounted sensor module (e.g., camera application).

Then, as shown in FIG. 10(*c*), the controller may change a display position of an icon 300 (e.g., camera icon) corresponding to the determined application (e.g., camera application). Here, the controller may output the icon 300 to a region 500 on the display unit 151, in correspondence to a mounting position of the sensor module on the rear surface of the body.

As shown in FIG. 10(*b*), on the display unit 151, information about a mounted sensor module may be displayed, and a region corresponding to a mounting position of the sensor module may be displayed so as to be recognizable. More specifically, the controller may apply a graphic effect to the region 500 corresponding to a mounting position of the sensor module 140, for recognition of the region 500.

That is, in the present invention, an application which can be driven by a mounted sensor module may be easily checked, and a mounting position and a size of the sensor module may be also easily checked.

At least part of applications stored in the memory can be driven by at least two sensor modules. As aforementioned, a map application will be explained hereinafter as an example. It is assumed that a communication module and a GPS module are required to drive a map application. The GPS module and the communication module may be included in a sensor module which can be detachably mounted to the body of the module-type mobile terminal.

A specific icon 300 corresponding to an application which can be driven by at least two sensor modules may be output to the display unit 151.

In the output state of the specific icon 300 corresponding to an application which can be driven by at least two sensor modules, the sensing unit may sense a mounted state of one of the at least two sensor modules.

Figure 11:
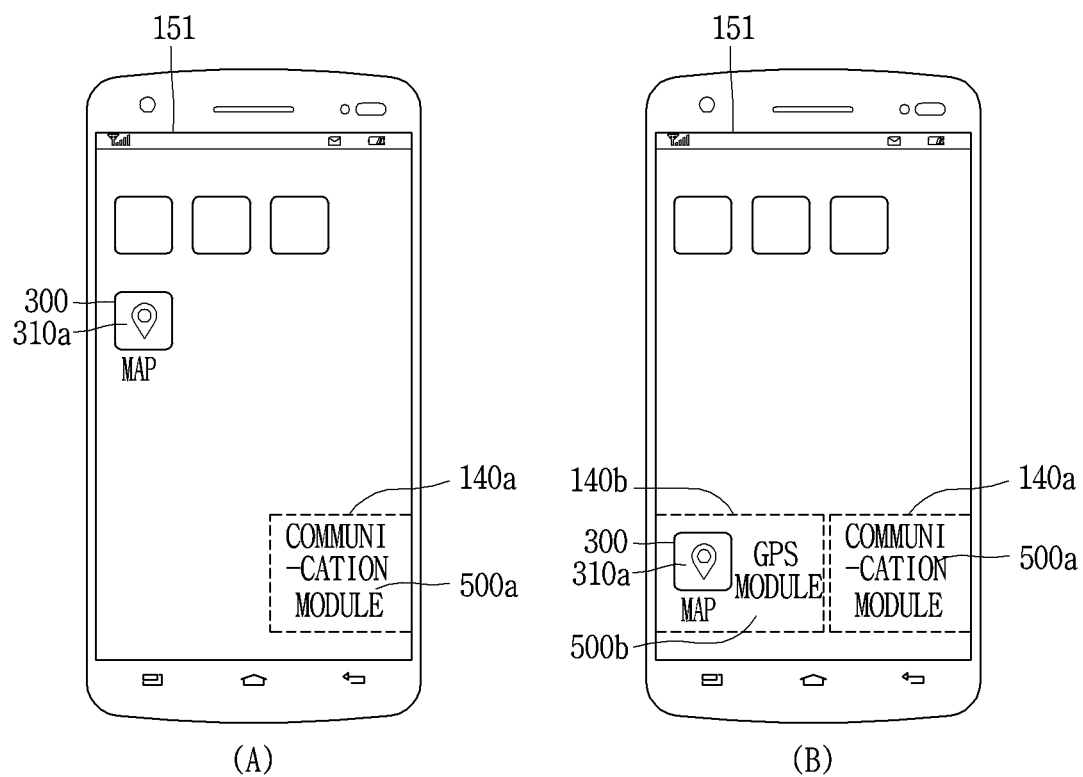

In this case, as shown in FIG. 11(*a*), the controller may control the display unit 151 such that a region 500a corresponding to a mounting position of a sensor module 140a may be recognizable. Further, the controller may output, to the display unit 151, information about the mounted sensor module 140a (e.g., a name of the sensor module).

Then, if another sensor module (e.g., GPS module 140b) rather than the mounted sensor module among the at least two sensor modules is additionally mounted, the controller may locate the specific icon 300 on a region 500b corresponding to a mounting position of said another sensor module, among regions 500a, 500b corresponding to mounting positions of the at least two sensor modules.

Here, the region 500b corresponding to a mounting position of said another sensor module may correspond to a position of a lastly-mounted sensor module among the at least two sensor modules.

For instance, as shown in FIG. 11(a), a specific icon 300 corresponding to an application which can be driven by at least two sensor modules may be output to the display unit 151.

As shown in FIG. 11(a), the sensing unit may sense a mounted state of one (e.g., communication module 140a) of the at least two sensor modules, to the rear surface of the body. If only one (e.g., 140a) of the at least two sensor modules is mounted, a display position of the specific icon 300 may be maintained.

Then, as shown in FIG. 11(b), if all of the at least two sensor modules are mounted, the controller may locate the specific icon 300 on a region corresponding to a position of a lastly-mounted sensor module, among regions corresponding to mounting positions of at least two sensor modules. That is, the specific icon 300 may be displayed on a region 500b corresponding to a position of a lastly-mounted sensor module. Although not shown, if one of at least two sensor modules is mounted, the specific icon 300 may be firstly displayed on a region 500a corresponding to a mounting position of said one sensor module. Then, whenever another sensor module among said at least two sensor modules is additionally mounted, a display position of the specific icon 300 may be changed to a region corresponding to a mounting position of said another sensor module.

The controller may determine a region corresponding to a mounting position of said one sensor module, based on a priority set to an application which can be driven by at least two sensor modules. More specifically, a display position of the specific icon 300 may be determined based on a priority preset to an application with respect to sensor modules.

For instance, one or more sensor modules required to drive a map application may be a communication module and a GPS module. It is assumed that the GPS module is set to the map application with a first priority, and the communication module is set to the map application with a second priority.

A display position of the specific icon 300 corresponding to the map application may be determined based on the set priorities. For instance, if both of the communication module and the GPS module are mounted to the rear surface of the body, the controller may locate the specific icon 300 on a region corresponding to a mounting position of the GPS module set with a first priority.

As another example, in a non-mounted state of the communication module and the GPS module, if the GPS module set with a first priority is mounted, the controller may locate the specific icon 300 on a region corresponding to a mounting position of the GPS module. Then, the display position of the specific icon 300 may be maintained, even if the communication module set with a second priority is mounted.

As another example, in a non-mounted state of the communication module and the GPS module, if the communication module set with a second priority is mounted, the controller may locate the specific icon 300 on a region corresponding to a mounting position of the communication module. Alternatively, even though the communication module is mounted, the controller may not change a display position of the specific icon 300. Then, if the GPS module set with a first priority is mounted, the controller may locate the specific icon 300 on a region corresponding to a mounting position of the GPS module.

As shown in FIG. 11(b), at least one of an indicator (graphic effect) and information about a mounted sensor module, may be output to the display unit 151, on regions corresponding to mounting positions of at least two sensor modules.

If the sensor module 140 senses a mounted state of the sensor module 140 to the rear surface of the body, the controller may generate a second page different from a first page to which one or more icons have been output. Then, the controller may display, on the second page, an icon corresponding to an application which can be driven by the mounted sensor module, among the one or more icons.

For instance, the one or more icons may be output to a home screen page. The home screen page may be implemented as one or more pages. If the home screen page is implemented as first and second pages, the first page may be converted into the second page different from the first page, based on a user's control command (e.g., a drag touch).

Here, it is assumed that a home screen page to which the one or more icons have been output is a first page 200a. For instance, referring to FIG. 12A(a), at least one icon has been output to the first page 200a.

The sensing unit may sense a mounted state of the sensor module 140 to the rear surface of the body. In this case, if the sensor module 140 is mounted, the controller may generate a second page 200b different from the first page. Then, as shown in FIG. 12A(b), the controller may determine an application which can be driven by the mounted sensor module 140, and may display an icon 300 corresponding to the determined application, on the generated second page 200b.

Figure 12A:
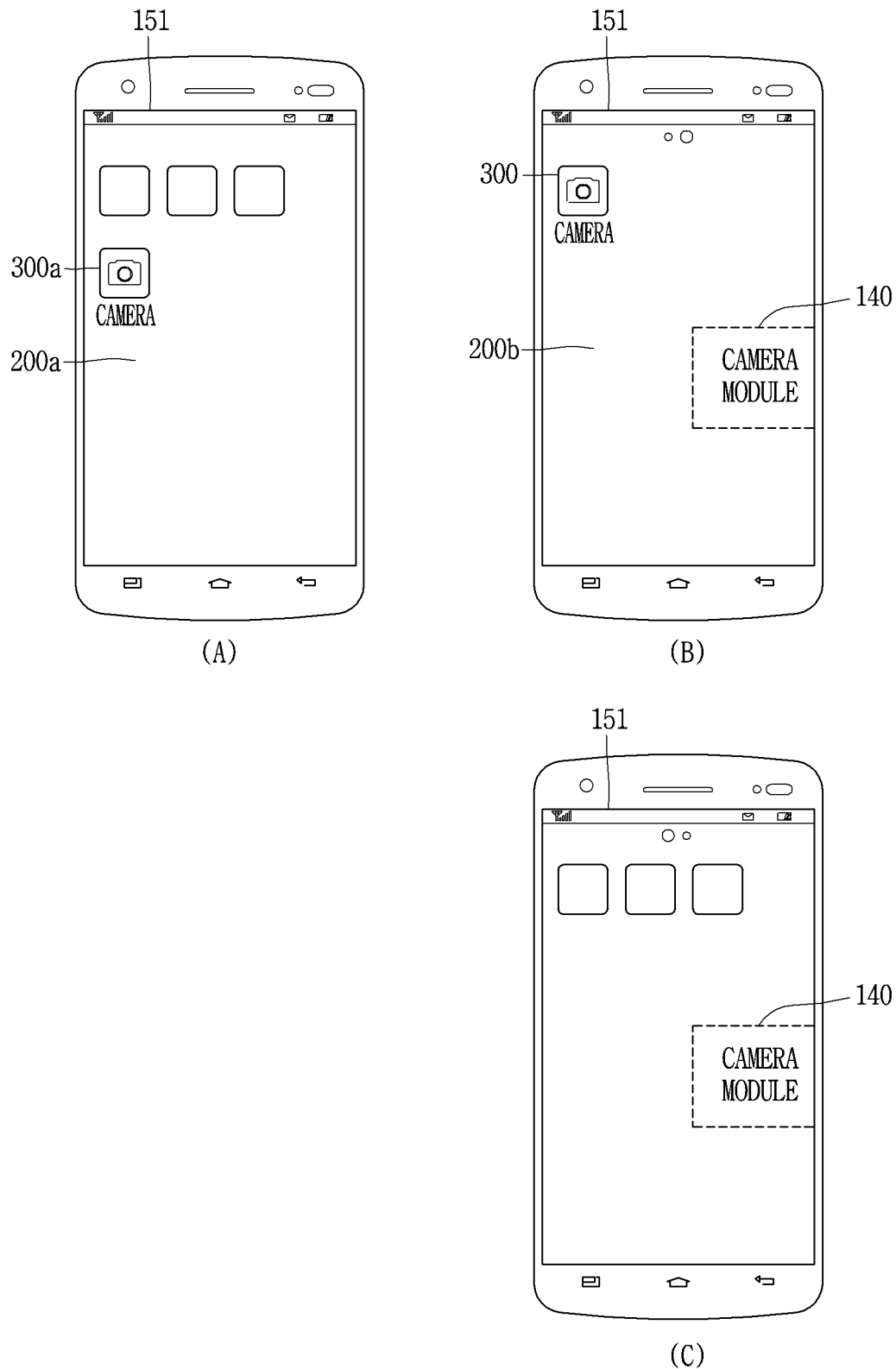

As shown in FIG. 12A(c), as the icon 300 corresponding to the determined application is displayed on the second page 200b, the icon 300 corresponding to the determined application may not be output to the first page 200a.

The icon 300 displayed on the second page 200b may be disposed within a region corresponding to a mounting position of the sensor module.

Figure 12B:
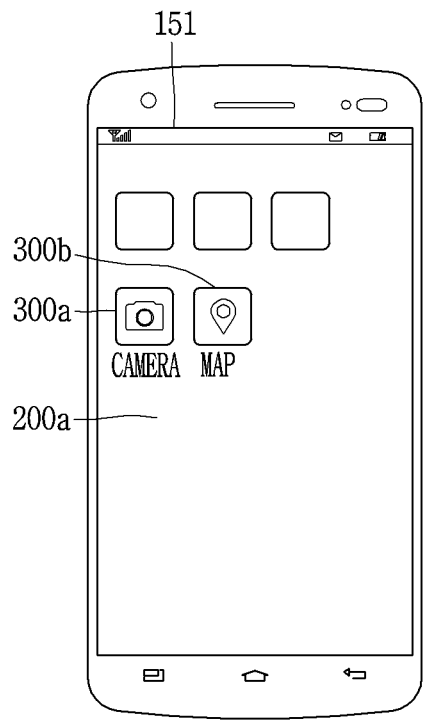
Figure 12B:
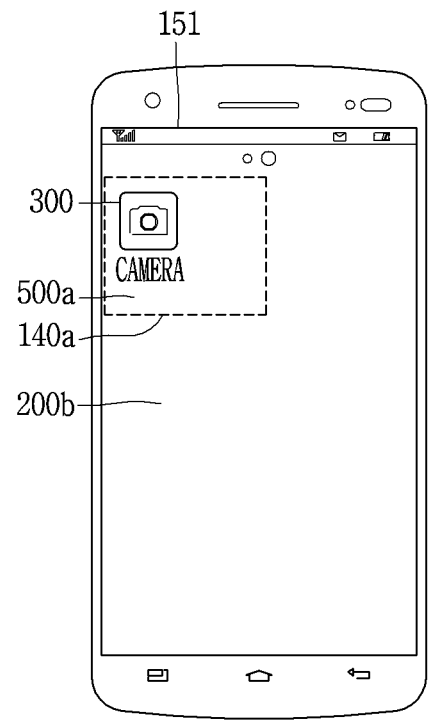
Figure 12B:
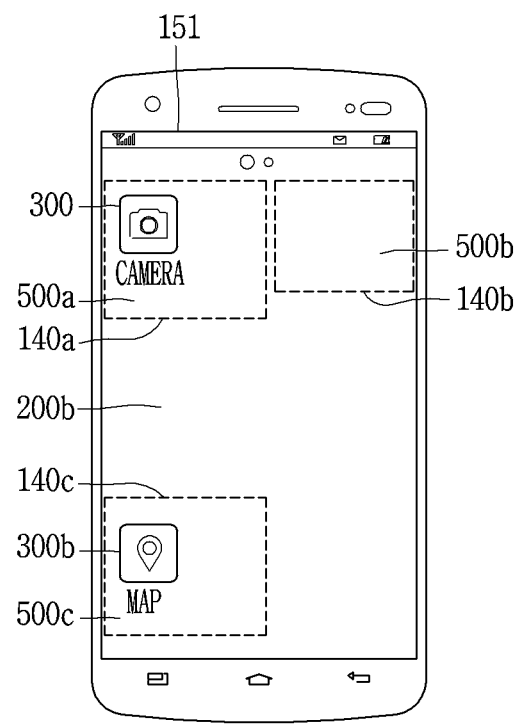

As shown in FIG. 12B(a), an icon 300a corresponding to a camera application, and an icon 300b corresponding to a map application may be output to a first page 200a.

Then, as shown in FIG. 12B(b), if a camera sensor module 140a required to drive a camera application is mounted, the controller may generate a second page 200b different from the first page 200a. And the controller may output the icon 300a corresponding to a camera application, to the second page 200b. Here, a display position of the icon 300a may be within a region corresponding to a mounting position of the camera sensor module 140a.

If at least two sensor modules (e.g., the communication module 140b and the GPS module 140c) required to drive a map application are mounted, the controller may display the icon 300b corresponding to a map application, on the second page 200b. Here, a display position of the icon 300b corresponding to a map application may be a region 500c corresponding to a mounting position of one sensor module, among regions 500b, 500c corresponding to mounting positions of the at least two sensor modules. Descriptions about FIG. 12C will be replaced by those aforementioned with reference to FIG. 11.

So far, have been explained the camera sensor module, the communication module, the GPS module, the camera application, the map application and the home screen page, as examples. However, this is merely for convenience. Thus, it should be noted that the present invention is not limited to this.

As aforementioned, in the present invention, based on a mounted state of a sensor module, an application which can be driven by the mounted sensor module may be determined. And a display position of an icon corresponding to the determined application may be changed. With such a configuration, a user may use the module-type mobile terminal with a great convenience, according to a detachable characteristic of the module-type mobile terminal.

In the present invention, based on a mounted module, a display method of an icon corresponding to an application which can be driven by the mounted sensor module may be changed. This may provide an optimum GUI to a user.

In the present invention, based on a mounted module, a display position of an icon corresponding to an application which can be driven by the mounted module may be changed. This may allow a user to more intuitively check an application which can be driven by the mounted module, and to more intuitively check a position of the mounted sensor module.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A module-type mobile terminal, comprising:
    a body;
    a display unit formed on a front surface of the body, and configured to output one or more icons related to an application in a first manner;
    a sensor module detachably mounted to a rear surface of the body, wherein the sensor module is mounted to or detached from the rear surface of the body;
    a sensing unit configured to sense whether the sensor module has been mounted to the rear surface of the body or not; and
    a controller configured to select an application which can be driven by the mounted sensor module, and to change a display manner of an icon corresponding to the selected application among the one or more icons, into a second manner different from the first manner,
    wherein the controller is further configured to change a display position of the icon corresponding to the selected application among the one or more icons, and
    wherein the icon corresponding to the selected application is displayed within a region corresponding to a mounting position of the sensor module on the rear surface of the body, among an output region of the display unit.

2. The module-type mobile terminal of claim 1, wherein the controller changes the display manner of the icon corresponding to the selected application into the second manner different from the first manner, by applying a graphic effect to the icon.

3. The module-type mobile terminal of claim 2, wherein the graphic effect is used to enlarge a size of the icon.

4. The module-type mobile terminal of claim 2, wherein the graphic effect is used to vibrate the icon.

5. The module-type mobile terminal of claim 2, wherein the graphic effect is used to change a color of at least one of the icon and a periphery of the icon.

6. The module-type mobile terminal of claim 1, wherein the controller outputs an indicator indicating the icon corresponding to the selected application, to a periphery of the icon.

7. The module-type mobile terminal of claim 1, wherein if the mounted sensor module is detached, the controller re-changes the display manner of the icon from the second manner to the first manner.

8. The module-type mobile terminal of claim 1, wherein in an output state of a specific icon corresponding to an application which can be driven by at least two sensor modules, if a mounted state of one of the at least two sensor modules is sensed, the controller changes a display manner of the specific icon into a third manner different from the first manner.

9. The module-type mobile terminal of claim 8, wherein an indicator, indicating the mounted state of one of the at least two sensor modules, is displayed on the icon displayed in the third manner.

10. The module-type mobile terminal of claim 8, wherein if one of the at least two sensor modules is mounted, the controller outputs information about another sensor module rather than the mounted sensor module, among the at least two sensor modules.

11. The module-type mobile terminal of claim 8, wherein if all of the at least two sensor modules are mounted, the controller displays the icon displayed in the third manner, in the second manner.

12. The module-type mobile terminal of claim 1, wherein the icon displayed in the first manner is deactivated so as not to be executable, and the icon displayed in the second manner is activated so as to be executable.

13. The module-type mobile terminal of claim 1, wherein the controller applies a graphic effect to a region corresponding to a mounting position of the sensor module, for recognition of the region.

14. The module-type mobile terminal of claim 1, wherein in an output state of a specific icon corresponding to an application which can be driven by at least two sensor modules, if the at least two sensor modules are mounted, the controller locates the specific icon on a region corresponding to a mounting position of one of the at least two sensor modules, among regions corresponding to mounting positions of the at least two sensor modules.

15. The module-type mobile terminal of claim 14, wherein the region corresponding to a mounting position of one of the at least two sensor modules, is a region corresponding to a position of a lastly-mounted sensor module among the at least two sensor modules.

16. The module-type mobile terminal of claim 14, wherein the controller determines the region corresponding to a mounting position of one of the at least two sensor modules, based on a priority set to an application which can be driven by the at least two sensor modules.

17. The module-type mobile terminal of claim 1, wherein when a mounted state of the sensor module is sensed, the controller generates a second page different from a first page where the one or more icons have been output, and displays the icon corresponding to the selected application on the second page.

18. The module-type mobile terminal of claim 17, wherein the icon displayed on the second page is located within a region corresponding to a mounting position of the sensor module.

19. The module-type mobile terminal of claim 1, wherein the controller is further configured to:
    change the display position of the icon by moving the icon to a position on the display unit formed on the front surface of the body that overlaps with the mounting position of the sensor module on the rear surface of the body.

20. A method for controlling a module-type mobile terminal, the method comprising:
    outputting one or more icons related to an application in a first manner;
    sensing whether a sensor module has been mounted or not;
    selecting an application which can be driven by the mounted sensor module;
    changing a display manner of an icon corresponding to the selected application among the one or more icons, into a second manner different from the first manner; and
    changing a display position of the icon corresponding to the selected application among the one or more icons,
    wherein the icon corresponding to the selected application is displayed within a region corresponding to a mounting position of the sensor module on the rear surface of the body, among an output region of the display unit.

* * * * *